(12) United States Patent
Sakai et al.

(10) Patent No.: US 9,834,462 B2
(45) Date of Patent: Dec. 5, 2017

(54) METHOD FOR REMOVING SCALES IN STEAM GENERATION FACILITY

(71) Applicant: KURITA WATER INDUSTRIES LTD., Nakano-ku, Tokyo (JP)

(72) Inventors: Mizuyuki Sakai, Hino (JP); Yukimasa Shimura, Komae (JP)

(73) Assignee: KURITA WATER INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/780,794

(22) PCT Filed: Mar. 27, 2014

(86) PCT No.: PCT/JP2014/059039
§ 371 (c)(1),
(2) Date: Sep. 28, 2015

(87) PCT Pub. No.: WO2014/162992
PCT Pub. Date: Oct. 9, 2014

(65) Prior Publication Data
US 2016/0075580 A1   Mar. 17, 2016

(30) Foreign Application Priority Data

Apr. 2, 2013   (JP) .................... 2013-076803

(51) Int. Cl.
*C02F 1/00*   (2006.01)
*C02F 5/08*   (2006.01)
(Continued)

(52) U.S. Cl.
CPC .............. *C02F 5/10* (2013.01); *C02F 1/66* (2013.01); *C02F 1/68* (2013.01); *C11D 3/3757* (2013.01);
(Continued)

(58) Field of Classification Search
CPC .......... C02F 5/10; C02F 5/08; C02F 2303/14; C02F 2303/22; C02F 1/66; C02F 2307/00;
(Continued)

(56) References Cited

U.S. PATENT DOCUMENTS 3,890,228 A * 6/1975 Hwa ................... C23F 11/08
                                                  210/699
4,575,425 A * 3/1986 Boffardi ............... C02F 5/105
                                                  210/697

(Continued)

FOREIGN PATENT DOCUMENTS

CN       1187204 A   7/1998
CN       1252388 A   5/2000
(Continued)

OTHER PUBLICATIONS

PCT, "International Search Report for International Application No. PCT/JP2014/059039".

(Continued)

*Primary Examiner* — Nam Nguyen
*Assistant Examiner* — Julia Wun
(74) *Attorney, Agent, or Firm* — Manabu Kanesaka (57) ABSTRACT

Provided is a method for removing a scale in a steam generation facility, whereby it becomes possible to remove a scale deposited on the inside of a boiler vessel during the operation of a boiler without causing corrosion of the boiler. A method for removing a scale in a steam generation facility is disclosed, wherein in the steam generation facility, a pH of boiler water is adjusted to 11.3 or more, and a polyacrylic acid having a weight average molecular weight that is 0.50 to 2.00 times a reference weight average molecular weight as calculated from the following calculation formula (1), or a salt thereof, is added in accordance with the pH value of (Continued)

the boiler water during the operation of a boiler, thereby removing a scale deposited on the inside of a boiler vessel:

Reference weight average molecular weight=−8462× {(pH value)−11.3}+61538   (1).

8 Claims, 3 Drawing Sheets

(51) Int. Cl.
    *C02F 5/10* (2006.01)
    *C02F 1/68* (2006.01)
    *F22B 37/52* (2006.01)
    *C11D 3/37* (2006.01)
    *C11D 11/00* (2006.01)
    *C23F 11/173* (2006.01)
    *C23F 14/02* (2006.01)
    *C02F 1/66* (2006.01)

(52) U.S. Cl.
    CPC ........ *C11D 11/0041* (2013.01); *C23F 11/173* (2013.01); *C23F 14/02* (2013.01); *F22B 37/52* (2013.01); *C02F 2303/14* (2013.01); *C02F 2303/22* (2013.01); *C02F 2307/00* (2013.01)

(58) Field of Classification Search
    CPC .......... C02F 1/68; C23F 11/173; C23F 14/02; C11D 3/3757; C11D 11/0041; F22B 37/52
    USPC .................. 210/696, 698, 701; 252/180, 175
    See application file for complete search history.

(56) References Cited

U.S. PATENT DOCUMENTS

| | | | |
|---|---|---|---|
| 4,711,726 A | | 12/1987 | Pierce et al. |
| 5,024,783 A | | 6/1991 | Busch et al. |
| 5,346,626 A | | 9/1994 | Momozaki et al. |
| 5,403,493 A | * | 4/1995 | Mouche ................ C09K 8/528 166/244.1 |
| 5,965,094 A | | 10/1999 | Sattin |
| 6,297,336 B1 | | 10/2001 | Shioji et al. |
| 2003/0124730 A1 | | 7/2003 | Bailey et al. |

FOREIGN PATENT DOCUMENTS

| | | |
|---|---|---|
| EP | 0577016 A1 | 1/1994 |
| JP | S59-189998 A | 10/1984 |
| JP | H04-193971 A | 7/1992 |
| JP | 2000-154996 A | 6/2000 |
| JP | 2004-27060 A | 1/2004 |
| JP | 2007-38120 A | 2/2007 |

OTHER PUBLICATIONS

Yang, H., "The Investigation and Application of RO Antiscalants Abroad," Membrane Science and Technology, Jun. 30, 1990, p. 49-55, vol. 10, No. 2, China Academic Journal Electronic Publishing House.

Europe Patent Office, "Search Report for European Patent Application No. 14779849.0," dated Sep. 28, 2016.

Taiwanese Patent Office, "Office Action for Taiwanese Patent Application No. 103112065," dated Jun. 7, 2017.

* cited by examiner

METHOD FOR REMOVING SCALES IN STEAM GENERATION FACILITY

RELATED APPLICATIONS

The present application is National Phase of International Application No. PCT/JP2014/059039 filed Mar. 27, 2014, and claims priority from Japanese Application No. 2013-076803, filed Apr. 2, 2013, the disclosure of which is hereby incorporated by reference herein in its entirety.

TECHNICAL FIELD

The present invention relates to a method for removing a scale in a steam generation facility.

BACKGROUND ART

In recent years, in order to reduce the energy costs, water system of reducing the amount of blow-down water system and carrying out the operation in a high concentration one increasing. In such water systems, a scale component dissolved in water, such as calcium, magnesium, silica, etc., also highly in concentrated, and hence, there is such a concern that such a component form scale deposition, thereby causing a reduction of thermal efficiency or clogging of a heat exchanger, or the like.

In particular, in boiler water systems, scale components which have been brought into the inside of a boiler vessel, such as calcium, magnesium, silica, iron, etc., form scale deposition on heating surfaces of high heat load, thereby possibly causing bulging, creeping, rupture, or a reduction of thermal efficiency due to overheating of steel materials.

In addition, the adhesion of a scale onto the heating surface causes heat transfer disturbance and generates an energy loss, resulting in an increase of the cost of fuel. For this reason, in the boiler water system and so on, in order to prevent the adhesion of a scale, water softened by removing calcium and magnesium that are the hard components in the raw water by a water softener is used as the feed-water.

In addition, there is also adopted a water treatment method in which a scale dispersant is added into the boiler water, thereby not only inhibiting the deposition of a trace amount of a hard component or a scale component, such as silica, etc., in the feed-water which has been brought into the boiler vessel onto the inside of the system but also discharging these components out the system by means of blowing-down.

The scale inhibition agent as referred to herein is one for preventing scaling of the hard component which has been brought into the water system, and for example, phosphates, such as trisodium phosphate, sodium tripolyphosphate, etc., or polymers, such as sodium polyacrylate, etc., are used.

Meanwhile, even in the case of adopting such a scale inhibition method, in the case where unexpected hard components leakage or the like occurs, and a scale deposition, the operation of a boiler is stopped, the boiler water is discharged by means of full blowing-down, and thereafter, chemical cleaning with a scale dissolving and removing agent is carried out. For example, PTL 1 describes a scale removal method by chemical cleaning with a chelating agent, such as high-concentration ethylenediaminetetraacetic acid (EDTA), etc., or an organic acid, such as sulfamic acid, etc.

However, according to the scale removal method of PTL 1, the boiler is once stopped, and hence, there are involved such problems that the productivity is impaired; and that the cleaning costs are separately generated.

In order to solve the foregoing problems, there is proposed a method for removing a scale without stopping the operation of the boiler. For example, PTL 2 describes a method in which a specified chelating agent, such as EDTA, nitrilotriacetic acid (NTA), diethylenetriamine, etc., and a specified dispersant, such a polymaleic acid, etc., are added into a boiler water, and a scale is removed while operating the boiler.

CITATION LIST

Patent Literature

PTL 1: JP H04-193971 A
PTL 2: JP 2000-154996 A

SUMMARY OF INVENTION

Technical Problem

However, the chelating agent used in the scale removal method of PTL 2 encounters such a problem that the chelating agent also acts on iron that is a base material of the boiler, resulting as corrosion.

Under such circumstances, the present invention has been made, and an object thereof is to provide a method for removing a scale in a steam generation facility, whereby it becomes possible to remove the scale deposited on the inside of a boiler vessel during the boiler operation without corrosion failure of the boiler.

Solution to Problem

In order to solve the foregoing problem, the present inventors made extensive and intensive investigations. As a result, it has been found that a polyacrylic acid or its salt, which has hitherto been used for the purpose of preventing the deposition of a scale onto the inside of a boiler vessel, may remove the deposited scale. Then, as a result of further investigations, the present inventors have found an effective use condition of the polyacrylic acid or its salt, under which the removal efficiency of the scale may be tremendously improved, leading to accomplishment of the present invention.

Specifically, the present invention provides the following [1] to [3].

[1] A method for removing a scale in a steam generation facility, wherein in the steam generation facility, a pH of boiler water is adjusted to 11.3 or more, and a polyacrylic acid having a weight average molecular weight that is 0.50 to 2.00 times a reference weight average molecular weight as calculated from the following calculation formula (1), or a salt thereof, is added in accordance with the pH value of the boiler water during the operation of a boiler, thereby removing a scale deposited on the inside of a boiler vessel:

$$\text{Reference weight average molecular weight} = -8462 \times \{(\text{pH value})-11.3\}+61538 \quad (1).$$

[2] A method for removing a scale in a steam generation facility, wherein in the steam generation facility, a pH of boiler water is adjusted to 11.3 or more, and a polyacrylic acid having a weight average molecular weight that is 0.50 to 2.00 times a reference weight average molecular weight as calculated by the following manner, or a salt thereof, is added in accordance with the pH value of the boiler water during the operation of a boiler, thereby removing a scale deposited on the inside of a boiler vessel:

[Calculation Method of Reference Weight Average Molecular Weight]

(1) In at least three pH values at a pH of 11.3 or more, a weight average molecular weight ($Mw_{max}$) of the polyacrylic acid at which a scale removal rate becomes maximum is measured; and (2) A relation formula between pH and $Mw_{max}$ is determined by the least squares method while defining the pH as the x-axis and the $Mw_{max}$ as the y-axis, respectively, and a weight average molecular weight at each pH obtained from the relation formula is defined as the reference weight average molecular weight.

[3] The method for removing a scale in a steam generation facility as set forth above in [1] or [2], wherein the polyacrylic acid or its salt is added such that a concentration thereof in the boiler water is 10 to 500 mg/L.

Advantageous Effects of Invention

In the method for removing a scale in a steam generation facility according to the present invention, it is possible to remove a scale deposited on the inside of a boiler vessel during the operation of a boiler without using a chelating agent.

DESCRIPTION OF EMBODIMENTS

A method for removing a scale in a steam generation facility according to the present invention is a method in which in the steam generation facility, a pH of boiler water is adjusted to 11.3 or more, and a polyacrylic acid having a weight average molecular weight that is 0.50 to 2.00 times a reference weight average molecular weight as calculated from the following calculation formula (1), or a salt thereof, is added in accordance with the pH value of the boiler water during the operation of a boiler, thereby removing a scale deposited on the inside of a boiler vessel:

$$\text{Reference weight average molecular weight} = -8462 \times \{(\text{pH value}) - 11.3\} + 61538 \quad (1).$$

Figure 1:
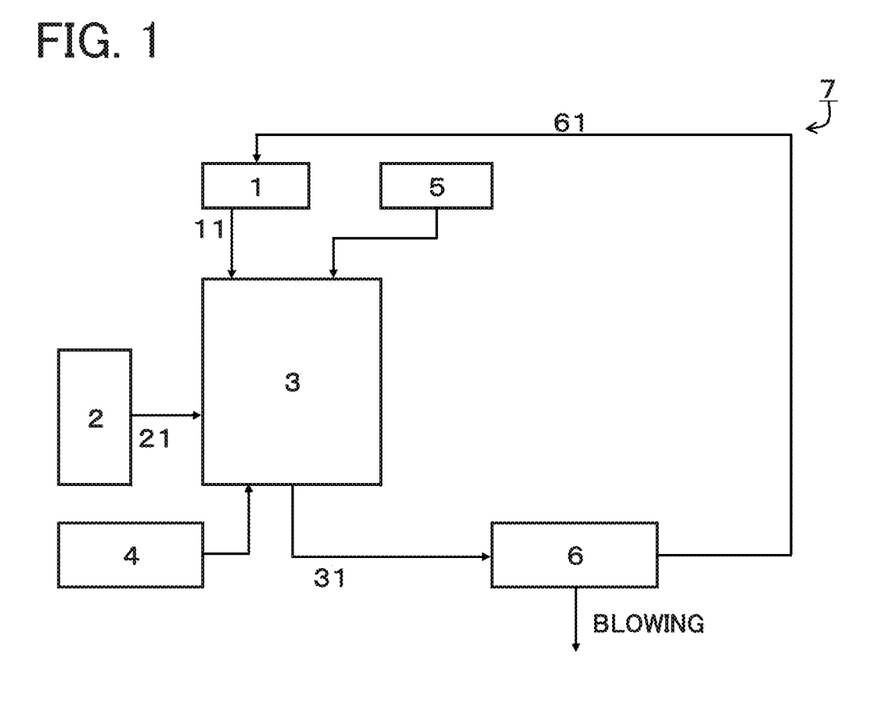
FIG. 1 is a view showing an embodiment of a steam generation facility for carrying out the present invention.

FIG. 1 is a view showing an embodiment of a steam generation facility for carrying out the present invention.

FIG. 1 shows a circulation-type steam generation facility 7 including a steam condensate tank 1, a steam condensate line 11, a makeup water tank 2, a makeup water line 21, a feed-water tank 3, a feed-water line 31, a means 4 for adding a polyacrylic acid or its salt, a means 5 for adding an alkali, a steam generation portion (boiler vessel) 6, and a drain recovery line 61.

It should be noted that though FIG. 1 shows the circulation-type steam generation facility, the scale removal method of the present invention is also applicable to a once-through steam generation facility.

<Adjustment of pH>

In the method for removing a scale in a steam generation facility according to the present invention, a pH of the boiler water is first adjusted to 11.3 or more.

Figure 2:
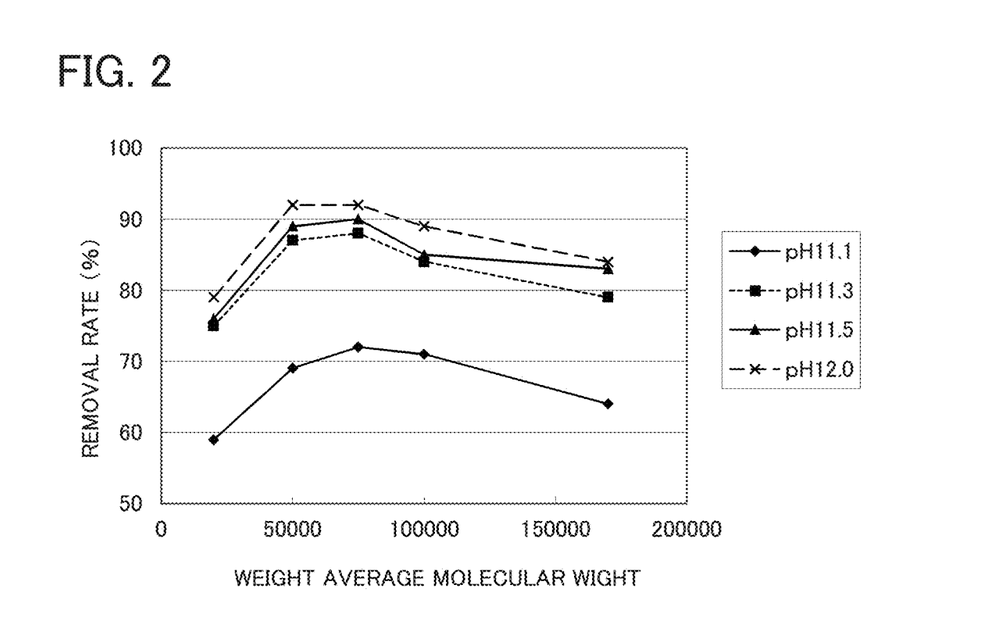
FIG. 2 is a graph showing a relation between a weight average molecular weight of a polyacrylic acid and a scale removal rate in a pH region of from 11.1 to 12.0.

FIG. 2 is a graph showing a relation between a weight average molecular weight of a polyacrylic acid and a scale removal rate in a pH region of from 11.1 to 12.0. As shown in FIG. 2, as the pH becomes high, the scale removal rate becomes high. In particular, it is perceived that there is a drastic difference in a pH region of from 11.1 to 11.3. It should be noted that FIG. 2 is based on the results of Test Example 1 as described later.

In this way, according to the present invention, by controlling the pH of the boiler water to 11.3 or more, a removal rate of the scale generated in the inside of the boiler vessel can be made favorable. As for the scale deposition onto the inside of the boiler vessel, the case where only a single component deposition is less, but in many cases, the scale is a mixture of multiple components inclusive of calcium, magnesium, silica, and the like. Here, when the pH rises to 11.3 or more, the solubility of silica in the generated scale mixture increases, and therefore, it may be considered that the scale mixture derived from calcium or magnesium is apt to be removed simultaneously.

The pH of the boiler water is preferably 11.5 or more from the viewpoint of a scale removal rate, whereas it is preferably 12.0 or more from the viewpoint of corrosion inhibition of the inside of the boiler vessel or the inside of the steam generation facility system.

In order to adjust the pH of the boiler water to 11.3 or more, there are exemplified a method of adding an alkaline agent, a method of adjusting a blow-down rate and/or a supply rate of feed-water to adjust a concentration cycles, and the like. A method of adding an alkaline agent is suitable from the viewpoint of easiness of the pH adjustment.

Examples of the alkaline agent include an alkali metal hydroxide, an alkali metal carbonate, an alkali metal phosphate, a neutral amine, and the like.

Examples of the alkali metal hydroxides include sodium hydroxide, potassium hydroxide, lithium hydroxide, and the like; examples of the alkali metal carbonates include sodium carbonate, potassium carbonate, and the like; and examples of the alkali metal phosphates include trisodium phosphate, sodium hydrogenphosphate, and the like.

In addition, examples of the neutral amines include monoethanolamine, cyclohexylamine, morpholine, diethylethanolamine, monoisopropanolamine, 3-methoxypropylamine, 2-amino-2-methyl-1-propanol, and the like.

Among the alkaline agents, the neutral amine migrates into the steam condensing system, and therefore, in order to adjust the pH of the boiler water to 11.3 or more, the neutral amine must be added in a high concentration. In addition, when the neutral amine is added in such a high concentration, an offensive smell is generated in the steam or steam condensate, or the pH of the steam condensate system excessively rises, so that when a copper-based material is present in the system, corrosion is possibly caused. For this reason, as the alkaline agent, an alkali metal hydroxide, an alkali metal carbonate, and an alkali metal phosphate are preferred; and sodium hydroxide, potassium hydroxide, sodium carbonate, and the like are more preferred from the viewpoint of economy.

The alkaline agent may be used solely or in combination of two or more thereof.

It is preferred to add the alkaline agent to the makeup water or feed-water. It should be noted that in the case where the steam generation facility is of a circulation type, the alkaline agent may be added to the steam condensate.

It should be noted that in order to supply an appropriate amount of the alkaline agent, it is preferred to provide a pH measuring means on the upstream side and/or the downstream side of the boiler vessel.

As the feed-water, water obtained by treating the raw water with a reverse osmosis membrane, water obtained by subjecting the raw water to a softening treatment, water obtained by subjecting the raw water to an ion exchange treatment, and the like may be used.

<Polyacrylic Acid or Salt Thereof>

In the present invention, a polyacrylic acid or a salt thereof is added while adjusting the pH of the boiler water to 11.3 or more.

The polyacrylic acid is not particularly limited, and it is possible to use one satisfying the requirement regarding the weight average molecular weight as described later. Examples of the polyacrylic acid salt include sodium salts, potassium salts, and the like of the aforementioned polyacrylic acid. The polyacrylic acid salt may be obtained by adding an alkali metal hydroxide, such as sodium hydroxide, potassium hydroxide, etc., an alkali metal carbonate, such as sodium carbonate, potassium carbonate, etc., or the like together with the polyacrylic acid.

In addition, in the present invention, a polyacrylic acid having a weight average molecular weight that is 0.50 to 2.00 times a reference weight average molecular weight as calculated from the following calculation formula (1), or a salt thereof, is used in accordance with the pH value of the boiler water.

$$\text{Reference weight average molecular weight} = -8462 \times \{(\text{pH value}) - 11.3\} + 61538 \quad (1)$$

In addition, the weight average molecular weight of the polyacrylic acid is preferably 0.70 to 1.70 times, more preferably 0.80 to 1.60 times, and still more preferably 0.90 to 1.40 times the reference weight average molecular weight as calculated from the foregoing calculation formula (1).

It should be noted that in the case of a salt of a polyacrylic acid, the weight average molecular weight of the polyacrylic acid that is a base of the polyacrylic acid salt has only to satisfy the aforementioned requirement.

Figure 3:
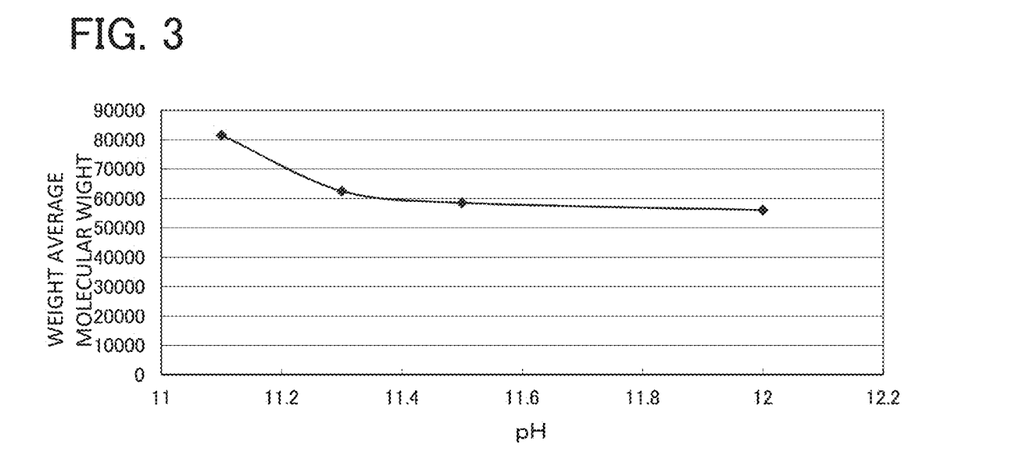
FIG. 3 is a graph showing a relation between a pH and a weight average molecular weight of a polyacrylic acid that is optimum for the scale removal in a pH region of from 11.1 to 12.0.

FIG. 3 is a graph showing a relation between a pH and a weight average molecular weight of a polyacrylic acid that is optimum for the scale removal in a pH region of from 11.1 to 12.0. As shown in FIG. 3, as the pH becomes high, the optimum weight average molecular weight of the polyacrylic acid becomes small, and it is perceived that there is a substantially linear relation in a pH region of from 11.3 to 12.0. The optimum weight average molecular weight of the polyacrylic acid at each pH, that is a base of FIG. 3, is one read out from FIG. 2.

Figure 4:
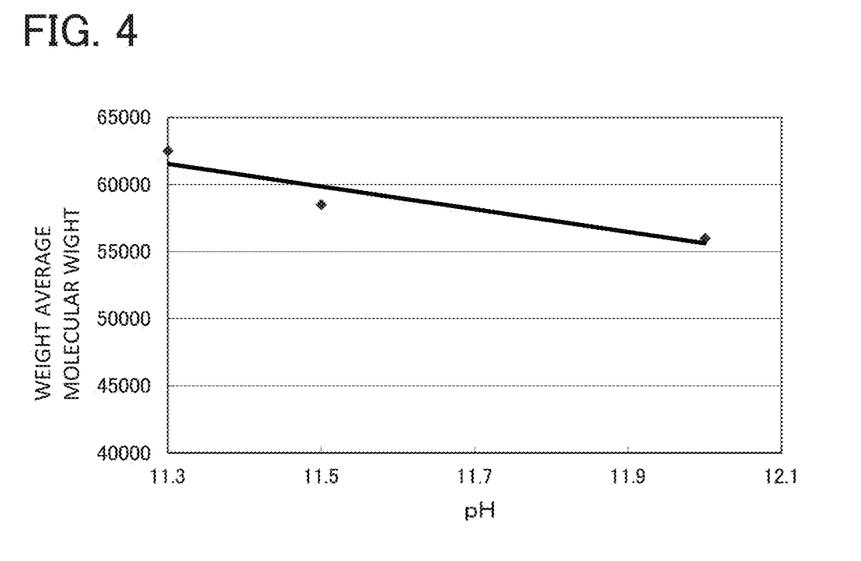
FIG. 4 is a graph of a relation between a pH and a weight average molecular weight of a polyacrylic acid that is optimum for the scale removal in a pH region of from 11.3 to 12.0 by the least squares method.

Then, by undergoing the least squares method of a section in a pH region of from 11.3 to 12.0 that is a substantially linear relation, the foregoing calculation formula (1) can be calculated, and a reference weight average molecular weight at each pH can be obtained (see FIG. 4).

It should be noted that in FIG. 4, the calculation formula for obtaining the reference weight average molecular weight from the least squares method regarding three pH points of 11.3, 11.5, and 12.0 is calculated; however, the following way may also be taken. Namely, in at least three pH values of 11.3 or more, a weight average molecular weight ($Mw_{max}$) of the polyacrylic acid at which a scale removal rate becomes maximum is measured, a relation formula between pH and $Mw_{max}$ is determined by the least squares method while defining the pH as the x-axis and the $Mw_{max}$ as the y-axis, respectively, and a weight average molecular weight at each pH obtained from the relation formula is defined as the reference weight average molecular weight.

In this way, in the present invention, the scale removal rate may be made favorable by adding the polyacrylic acid satisfying the foregoing calculation formula (1) or its salt in accordance with the pH value of the boiler water.

An addition amount of the polyacrylic acid or its salt is preferably 10 to 500 mg/L in terms of its concentration in the boiler water. So long as the addition amount of the polyacrylic acid or its salt is 10 mg/L or more, the scale removing effect may be made easy to exhibit, and so long as it is 500 mg/L or less, the cost-effectiveness may be made favorable while preventing complicatedness of the waste water treatment due to an increase of COD from occurring.

In addition, the addition amount of the polyacrylic acid or its salt is more preferably 20 to 400 mg/L, still more preferably 30 to 300 mg/L, and yet still more preferably 50 to 250 mg/L in terms of its concentration in the boiler water.

It is preferred to add polyacrylic acid or its salt to the makeup water or feed-water. It should be noted that in the case where the steam generation facility is of a circulation type, the polyacrylic acid or its salt may be added to the steam condensate.

It should be noted that it is preferred to make a constitution so as to provide a pH measuring means on the upstream side and/or the downstream side of the boiler vessel and associate the pH measuring means with a means for adding the polyacrylic acid or its salt, thereby automatically selecting and adding the polyacrylic acid having an appropriate weight average molecular weight.

<Arbitrary Additives>

In the present invention, various additives, for example, an oxygen scavenger, a corrosion-inhibitor, a scale-inhibitor, and the like, may be used, if desired in any one of places in the system of the steam generation facility within the range where the object of the present invention is not impaired.

Examples of the scale-inhibitor include various phosphates, water-soluble polymer compounds, such as a polyacrylic acid not satisfying the aforementioned requirement (one having a lower weight average molecular weight), a polymethacrylic acid, a polymaleic acid, and sodium salts thereof, etc., phosphonates, chelating agents, and the like. Of those, a polymethacrylic acid is suitable from the standpoint that by using it in combination with the polyacrylic acid satisfying the aforementioned requirement or its salt, in the case where the iron concentration in the feed-water to the boiler is more than 0.3 mg/L, the scale removal efficiency (for example, in the case of a high concentration of 0.3 to 5.0 mg/L) may be drastically improved.

A concentration of the polymethacrylic acid in the boiler water is preferably 1 to 1,000 mg/L, and more preferably 10 to 500 mg/L. In addition, it is preferred to add the polymethacrylic acid in such a manner that a mass ratio of the polyacrylic acid (salt) to the polymethacrylic acid (salt) in the boiler water is 1/100 to 100/1, and especially 1/50 to 50/1.

In addition, a weight average molecular weight of the polymethacrylic acid is preferably 1,000 to 100,000, and more preferably 5,000 to 60,000. When the weight average molecular weight of the polymethacrylic acid is less than 1,000, there is a concern that the sufficient scale inhibiting effect for iron may not be obtained, whereas when the weight average molecular weight of the polymethacrylic acid is more than 100,000, the effect is lowered.

EXAMPLES

Next, the present invention is explained in more detail by reference to Examples, but it should be construed that the present invention is not limited at all by these Examples.

Test Example 1

Any influences of the pH and the weight average molecular weight of the polyacrylic acid against the scale removal rate were investigated under the following conditions.

Test equipment: Stainless steel-made test boiler
Synthetic water A: Ca hardness: 10 mg $CaCO_3$/L, Mg hardness: 5 mg $CaCO_3$/L, silica: 15 mg/L, sodium carbonate: 25 mg/L in terms of concentrations in the feed-water
Synthetic water B: Silica: 15 mg/L in terms of a concentration in the feed-water; 20 mg/L in terms of a concentration in the feed-water (200 mg/L in terms of a concentration in the inside of the boiler vessel) of a polyacrylic acid having a weight average molecular weight shown in Table 1 was added, and sodium carbonate was also added to the feed-water so as to provide a pH of the boiler water shown in Table 1.
Temperature of feed-water: 40° C.
Operative pressure: 2.0 MPa
Supply rate of feed-water: 9 L/h
Concentration cycles: 10 times
Measurement of Scale Removal Rate:
Three heating tubes (steel-made, surface area: 200 $cm^2$) are weighed and recorded before the test. In the stainless steel-made test boiler (holding water quantity: 5 L), synthetic water concentrated to an extent corresponding to 10 times the concentration cycles in the inside of the boiler vessel (corresponding to 10 times the concentration cycles of the synthetic water A) was prepared and charged, and the test boiler was operated at a pressure of 2.0 MPa, an evaporation rate of 8.2 L/h, and a blow down rate of 0.8 L/h in a concentration cycles of 10 times for 21 hours while supplying the synthetic water A. After the operation, the scale-deposited three heating tubes (iron-made, surface area: 200 $cm^2$) were taken out and weighed, and an amount of the deposited scale was calculated. Thereafter, the heating tubes were again inserted; in the vessel, synthetic water concentrated to an extent corresponding to 10 times the concentration cycles of the synthetic water B was prepared and charged; and the test boiler was operated with the synthetic water B for 3 days under the same conditions, followed by undergoing the scale removal step. After the operation, the heating tubes were weighed in the same manner, and a scale removal rate was calculated from the amount of the deposited scale before and after the scale removal step. The results are shown in Table 1. In addition, a relation between the weight average molecular weight of the polyacrylic acid and the scale removal rate at every pH is shown in FIG. 2.

TABLE 1

|  | Weight average molecular weight | pH | Scale removal rate (%) |
| --- | --- | --- | --- |
| Test Example 1-1 | 20,000 | 11.1 | 59 |
| Test Example 1-2 | 50,000 | 11.1 | 69 |
| Test Example 1-3 | 75,000 | 11.1 | 72 |

TABLE 1-continued

|  | Weight average molecular weight | pH | Scale removal rate (%) |
| --- | --- | --- | --- |
| Test Example 1-4 | 100,000 | 11.1 | 71 |
| Test Example 1-5 | 170,000 | 11.1 | 64 |
| Test Example 1-6 | 20,000 | 11.3 | 75 |
| Test Example 1-7 | 50,000 | 11.3 | 87 |
| Test Example 1-8 | 75,000 | 11.3 | 88 |
| Test Example 1-9 | 100,000 | 11.3 | 84 |
| Test Example 1-10 | 170,000 | 11.3 | 79 |
| Test Example 1-11 | 20,000 | 11.5 | 76 |
| Test Example 1-12 | 50,000 | 11.5 | 89 |
| Test Example 1-13 | 75,000 | 11.5 | 90 |
| Test Example 1-14 | 100,000 | 11.5 | 85 |
| Test Example 1-15 | 170,000 | 11.5 | 83 |
| Test Example 1-16 | 20,000 | 12.0 | 79 |
| Test Example 1-17 | 50,000 | 12.0 | 92 |
| Test Example 1-18 | 75,000 | 12.0 | 92 |
| Test Example 1-19 | 100,000 | 12.0 | 89 |
| Test Example 1-20 | 170,000 | 12.0 | 84 |

It is noted from Table 1 and FIG. 2 that when the pH is 11.3 or more, the scale removal rate is tremendously improved. In addition, it is noted that when the weight average molecular weight of the polyacrylic acid is low, the scale removal rate is lowered, whereas when it is excessively high, the scale removal rate is lowered, too.

In addition, it is noted from the curve at each pH in FIG. 2 that the weight average molecular weight of the polyacrylic acid that is optimum for the scale removal is present at each pH. Specifically, it is read out that the optimum weight average molecular weight of the polyacrylic acid is 81,500 at the pH of 11.1, 62,500 at the pH of 11.3, 58,500 at the pH of 11.5, and 56,000 at the pH of 12.0, respectively.

FIG. 3 is a graph showing an optimum weight average molecular weight of a polyacrylic acid at each pH. It is noted from FIG. 3 that a substantially linear relation is perceived in a pH region of from 11.3 to 12.0.

When the least squares method of a section in a pH region of from 11.3 to 12.0 in a substantially linear relation is undergone, its intercept is 61,538, and its slope is −8,462.

FIG. 4 is a graph a relation between a pH and a weight average molecular weight of a polyacrylic acid that is optimum for the scale removal in a pH region of from 11.3 to 12.0 by the least squares method. In order to improve the scale removal rate, it is noted that the weight average molecular weight of the polyacrylic acid has only to be determined on the basis of the straight line (calculation formula (1) as described below) of FIG. 4 in view of the relation with the pH.

$$\text{Reference weight average molecular weight} = -8462 \times \{(\text{pH value}) - 11.3\} + 61538 \quad (1)$$

In addition, it is noted from FIG. 2 that the equal scale removal rate can be obtained in a region of even less or more than the weight average molecular weight of the polyacrylic acid that is optimum for the scale removal; and that the scale removal rate on the higher side than the optimum weight average molecular weight is hardly lowered as compared with that on the lower side than the optimum weight average molecular weight.

It is noted from the foregoing results that when the requirement to add a polyacrylic acid having a weight average molecular weight that is 0.50 to 2.00 times a reference weight average molecular weight as calculated from the foregoing calculation formula (1), or a salt thereof, in accordance with the pH value of the boiler water is satisfied, it is possible to improve the scale removal rate.

In the foregoing test examples, Test Examples 1-7, 1-8, 1-9, 1-12, 1-13, 1-14, 1-17, 1-18, and 1-19 satisfy the subject requirement, and it is noted that in these test examples, the scale removal rate is favorable as compared with other test examples in which the pH is identical.

Test Example 21

Any influences of the polyacrylic acid and the chemical concentration against the scale removal rate were investigated under the following conditions.

Test equipment: Stainless steel-made test boiler

Synthetic water C: Ca hardness: 20 mg $CaCO_3$/L, Mg hardness: 10 mg $CaCO_3$/L, silica: 15 mg $SiO_2$/L, sodium carbonate: 35 mg $Na_2CO_3$/L in terms of concentrations in the feed-water Synthetic water D: Silica: 15 mg $SiO_2$/L and sodium carbonate: 20 mg $Na_2CO_3$/L in terms of concentrations in the feed-water; and a chemical shown in Table 2 was added to the feed-water so as to provide a concentration in the inside of the boiler vessel shown in Table 2.

Temperature of feed-water: 40° C.
Operative pressure: 2.0 MPa
Supply rate of feed-water: 9 L/h
Concentration cycles: 10 times Measurement of Scale Removal Rate:

Three heating tubes (steel-made, surface area: 200 cm$^2$) before the test are weighed and recorded. In a stainless steel-made test boiler (holding water quantity: 5 L), synthetic water concentrated to an extent corresponding to 10 times the concentration cycles in the inside of the boiler vessel (corresponding to 10 times the concentration cycles of the synthetic water C) was prepared and charged, and the test boiler was operated at a pressure of 2.0 MPa, an evaporation rate of 8.2 L/h, and a blow rate of 0.8 L/h in a concentration cycles of 10 times for 21 hours while supplying the synthetic water C. After the operation, the scale-deposited on the surface of three heating tubes (iron-made, surface area: 200 cm$^2$) were taken out and weighed, and an amount of the deposited scale was calculated. Thereafter, the heating tubes were again inserted; in the vessel, synthetic water concentrated to an extent corresponding to 10 times the concentration cycles of the synthetic water D was prepared and charged; and the test boiler was operated with the synthetic water D for 6 days under the same conditions, followed by undergoing the scale removal step. After the operation, the heating tubes were weighed in the same manner, and a scale removal rate was calculated from the amount of the deposited scale before and after the scale removal step. The results are shown in Table 2.

TABLE 2

| | Chemical | | | |
|---|---|---|---|---|
| Kind | Weight average molecular weight | Chemical concentration (mg/L) | pH | Scale removal rate (%) |
| Test Example 2-1 | PAA | 4,000 | 10 | 11.3 | 12 |
| Test Example 2-2 | PAA | 4,000 | 100 | 11.3 | 23 |
| Test Example 2-3 | PAA | 4,000 | 500 | 11.3 | 26 |
| Test Example 2-4 | PAA | 10,000 | 100 | 11.3 | 28 |
| Test Example 2-5 | AA/AMPS | 10,000 | 100 | 11.3 | 22 |
| Test Example 2-6 | AA/HAPS | 10,000 | 100 | 11.3 | 26 |
| Test Example 2-7 | PAA | 20,000 | 50 | 11.3 | 61 |
| Test Example 2-8 | PAA | 20,000 | 100 | 11.3 | 71 |
| Test Example 2-9 | PAA | 52,000 | 10 | 11.3 | 32 |
| Test Example 2-10 | PAA | 52,000 | 20 | 11.3 | 44 |
| Test Example 2-11 | PAA | 52,000 | 30 | 11.3 | 62 |
| Test Example 2-12 | PAA | 52,000 | 50 | 11.3 | 73 |
| Test Example 2-13 | PAA | 52,000 | 100 | 11.3 | 85 |
| Test Example 2-14 | PAA | 52,000 | 500 | 11.3 | 90 |
| Test Example 2-15 | PAA | 60,000 | 50 | 11.3 | 78 |
| Test Example 2-16 | PAA | 60,000 | 100 | 11.3 | 88 |
| Test Example 2-17 | PAA | 60,000 | 500 | 11.3 | 93 |
| Test Example 2-18 | PAA | 75,000 | 50 | 11.3 | 76 |
| Test Example 2-19 | PAA | 75,000 | 100 | 11.3 | 87 |
| Test Example 2-20 | PAA | 75,000 | 500 | 11.3 | 91 |
| Test Example 2-21 | PAA | 100,000 | 50 | 11.3 | 72 |
| Test Example 2-22 | PAA | 100,000 | 100 | 11.3 | 77 |
| Test Example 2-23 | PAA | 170,000 | 100 | 11.3 | 70 |
| Test Example 2-24 | PAA | 250,000 | 100 | 11.3 | 19 |

*PAA: Polyacrylic acid
*AA: Acrylic acid
*AMPS: 2-Acrylamide-2-methylpropanesulfone
*HAPS: 3-Allyloxy-2-hydroxy-1-propanesulfonic acid
* AA/AMPS and AA/HAPS each are 80/20.

It is noted from the results of Table 2 that by increasing the concentration of the polyacrylic acid, the scale removal rate is improved. On the other hand, in the case of not using the polyacrylic acid, it is noted that even though increasing the concentration of the chemical, the scale removal rate cannot be sufficiently increased.

In the foregoing test examples, Test Examples 2-9 to 2-22 satisfy the requirement regarding the weight average molecular weight of the polyacrylic acid according to the present invention, and it is noted that in these test examples, the scale removal rate is favorable as compared with other test examples in which the concentration of the polyacrylic acid is identical.

Test Example 31

In undergoing the scale removal using the synthetic water D (however, under the conditions shown in Table 3 regarding the kind of chemical, the molecular weight, and the concentration in the inside of boiler vessel) under the same conditions as those in Test Example 2, a steel-made test piece (SGP, 15×50×10 mm, polished with #400) was installed in the boiler vessel. After the test, a derusting treatment was carried out, and a corrosion rate was determined according to the following calculation formula (2).

Corrosion rate (mdd)=Corrosion weight loss of test piece (mg)/{Surface area of test piece (dm$^2$)× Test period (day)}

TABLE 3

| | Chemical | | | |
|---|---|---|---|---|
| Kind | Weight average molecular weight | Chemical concentration (mg/L) | pH | Corrosion rate (mdd) |
| Test Example 3-1 | PAA | 2,000 | 200 | 11.3 | 13 |
| Test Example 3-2 | PAA | 52,000 | 200 | 11.3 | 16 |
| Test Example 3-3 | PAA | 75,000 | 200 | 11.3 | 16 |

TABLE 3-continued

| | | Chemical | | | |
|---|---|---|---|---|---|
| | Kind | Weight average molecular weight | Chemical concentration (mg/L) | pH | Corrosion rate (mdd) |
| Test Example 3-4 | PAA | 100,000 | 200 | 11.3 | 21 |
| Test Example 3-5 | PAA | 170,000 | 200 | 11.3 | 22 |
| Test Example 3-6 | PMAA | 10,000 | 200 | 11.3 | 14 |
| Test Example 3-7 | EDTA | — | 200 | 11.3 | 72 |
| Test Example 3-8 | NTA | — | 200 | 11.3 | 59 |

*PMAA: Polymethacrylic acid

It is noted from the results of Table 3 that in the mode of scale removal not using a chelating agent such as EDTA or NTA, the corrosion rate is slow.

Test Example 41

(Total Scale Removal Rate)
The test boiler having three heating tubes (steel-made, surface area: 200 cm$^2$) was operated for 21 hours under the same conditions as those in Test Example 2, except that synthetic water F prepared by adding iron chloride and iron hydroxide to the synthetic water C in a mass proportion of 1/1 such that the iron concentration was 1.5 mg Fe/L was used as the feed-water. After the operation, one of the three heating tubes was taken out and exchanged with a polished heating tube. In addition, the heating tube as taken out was weighed, and an amount of the deposited scale was calculated.

Subsequently, the test boiler was operated for 6 days under the same conditions as those in Test Example 2, except that synthetic water G prepared by adding iron chloride and iron hydroxide to the synthetic water D in a mass proportion of 1/1 such that the iron concentration was 1.5 mg Fe/L and changing the kind of chemical, the molecular weight, and the concentration in the inside of the boiler vessel as shown in Table 4 was used as the feed-water, respectively, followed by undergoing the scale removal step. After the additional operation, the heating tubes which had not been exchanged after the preceding operation were weighed, and a total scale removal rate was calculated from the amount of the deposited scale before and after the scale removal step. The results are shown in Table 4.

In the foregoing test examples, Test Examples 4-2 to 4-11 satisfy the requirement regarding the weight average molecular weight of the polyacrylic acid according to the present invention. These Test Examples exhibit a favorable scale removal rate, and above all, Test Examples 4-8 to 4-11 exhibit a conspicuously excellent scale removal rate. From these results, it is possible to confirm that in the case where iron is contained in a relatively high concentration in the boiler feed-water, when the polyacrylic acid is combined with the polymethacrylic acid, the total scale removal rate can be drastically improved as compared with the sole treatment with the polyacrylic acid. It may be presumed that this fact demonstrates that when the polyacrylic acid is used solely, the dispersing effect of the iron scale cannot be optimized, and the iron scale is further deposited on the hard components scale, thereby lowering the effect of removing the hard components scale. On the other hand, it is noted that in the case of combining the polyacrylic acid with the polymethacrylic acid, the adhesion of the iron scale onto the hard components scale is prevented from occurring, whereby the effect of removing the hard components scale with the polyacrylic acid is sufficiently exhibited.

REFERENCE SIGNS LIST

1: Steam condensate tank
11: Steam condensate line
2: Makeup water tank
21: Makeup water line
3: Feed-water tank
31: Feed-water line
4: Polyacrylic acid or its salt
5: Alkaline agent
6: Steam generation portion (boiler vessel)
61: Drain recovery line
7: Steam generation facility

The invention claimed is:
1. A method for removing scale in a steam generation facility having a boiler, comprising:
adjusting a pH of boiler water to 11.3 or more during operation of the boiler,
selecting a polyacrylic acid having a weight average molecular weight that is 0.50 to 2.00 times a reference weight average molecular weight as calculated from formula (1), or a salt thereof, and

TABLE 4

| | Chemical 1 | | | Chemical 2 | | | | |
|---|---|---|---|---|---|---|---|---|
| | Kind | Weight average molecular weight | Chemical concentration (mg/L) | Kind | Weight average molecular weight | Chemical concentration (mg/L) | pH | Scale removal rate (%) |
| Test Example 4-1 | Blank | — | — | — | — | — | 11.3 | 2 |
| Test Example 4-2 | PAA | 52,000 | 100 | — | — | — | 11.3 | 61 |
| Test Example 4-3 | PAA | 75,000 | 100 | — | — | — | 11.3 | 63 |
| Test Example 4-4 | PAA | 100,000 | 100 | — | — | — | 11.3 | 54 |
| Test Example 4-5 | PAA | 52,000 | 200 | — | — | — | 11.3 | 69 |
| Test Example 4-6 | PAA | 75,000 | 200 | — | — | — | 11.3 | 71 |
| Test Example 4-7 | PAA | 100,000 | 200 | — | — | — | 11.3 | 61 |
| Test Example 4-8 | PAA | 52,000 | 100 | PMAA | 10,000 | 100 | 11.3 | 88 |
| Test Example 4-9 | PAA | 60,000 | 100 | PMAA | 10,000 | 100 | 11.3 | 93 |
| Test Example 4-10 | PAA | 75,000 | 100 | PMAA | 10,000 | 100 | 11.3 | 90 |
| Test Example 4-11 | PAA | 100,000 | 100 | PMAA | 10,000 | 100 | 11.3 | 81 | adding the polyacrylic acid or the salt thereof selected to a boiler water, thereby removing a scale deposited on an inside of a boiler vessel of the boiler,
wherein $$\text{the reference weight average molecular weight} = 8462 \times \{(\text{pH value}) - 11.3\} + 61538 \qquad \text{Formula (1)}.$$

2. A method for removing scale in a steam generation facility having a boiler, comprising:
adjusting a pH of boiler water to 11.3 or more during operation of the boiler,
selecting a polyacrylic acid having a weight average molecular weight that is 0.50 to 2.00 times a reference weight average molecular weight as calculated by a calculation method of the reference weight average molecular weight, or a salt thereof, and
adding the polyacrylic acid or the salt thereof selected to a boiler water, thereby removing a scale deposited on an inside of a boiler vessel of the boiler,
wherein the calculation method of the reference weight average molecular weight includes
(1) in at least three pH values at a pH of 11.3 or more, measuring a weight average molecular weight ($Mw_{max}$) of the polyacrylic acid at which a scale removal rate becomes maximum; and
(2) determining a relation formula between pH and $Mw_{max}$ by the least squares method while defining the pH as the x-axis and the $Mw_{max}$ as the y-axis, respectively, and defining a weight average molecular weight at each pH obtained from the relation formula as the reference weight average molecular weight.

3. The method for removing scale in a steam generation facility according to claim 1, wherein the polyacrylic acid or its salt is added such that an initial concentration thereof in the boiler water is 10 to 500 mg/L.

4. The method for removing scale in a steam generation facility according to claim 2, wherein the polyacrylic acid or its salt is added such that an initial concentration thereof in the boiler water is 10 to 500 mg/L.

5. The method for removing scale in a steam generation facility according to claim 1, further comprising adding polymethacrylic acid to the steam generation facility to prevent the scale,
wherein a concentration of the polymethacrylic acid in the boiler water is 10 to 500 mg/L,
a mass ratio of the polyacrylic acid or the salt thereof to the polymethacrylic acid in the boiler water is 1/50 to 50/1, and
a weight average molecular weight of the polymethacrylic acid is 5,000 to 60,000.

6. The method for removing scale in a steam generation facility according to claim 2, further comprising adding polymethacrylic acid to the steam generation facility to prevent the scale,
wherein a concentration of the polymethacrylic acid in the boiler water is 10 to 500 mg/L,
a mass ratio of the polyacrylic acid or the salt thereof to the polymethacrylic acid in the boiler water is 1/50 to 50/1, and
a weight average molecular weight of the polymethacrylic acid is 5,000 to 60,000.

7. The method for removing scale in a steam generation facility according to claim 1, wherein the polyacrylic acid is a homopolymer of acrylic acid.

8. The method for removing scale in a steam generation facility according to claim 2, wherein the polyacrylic acid is a homopolymer of acrylic acid.

* * * * *